March 7, 1950 G. A. LYON 2,499,398
PLASTIC EXTRUDER
Filed Dec. 22, 1945
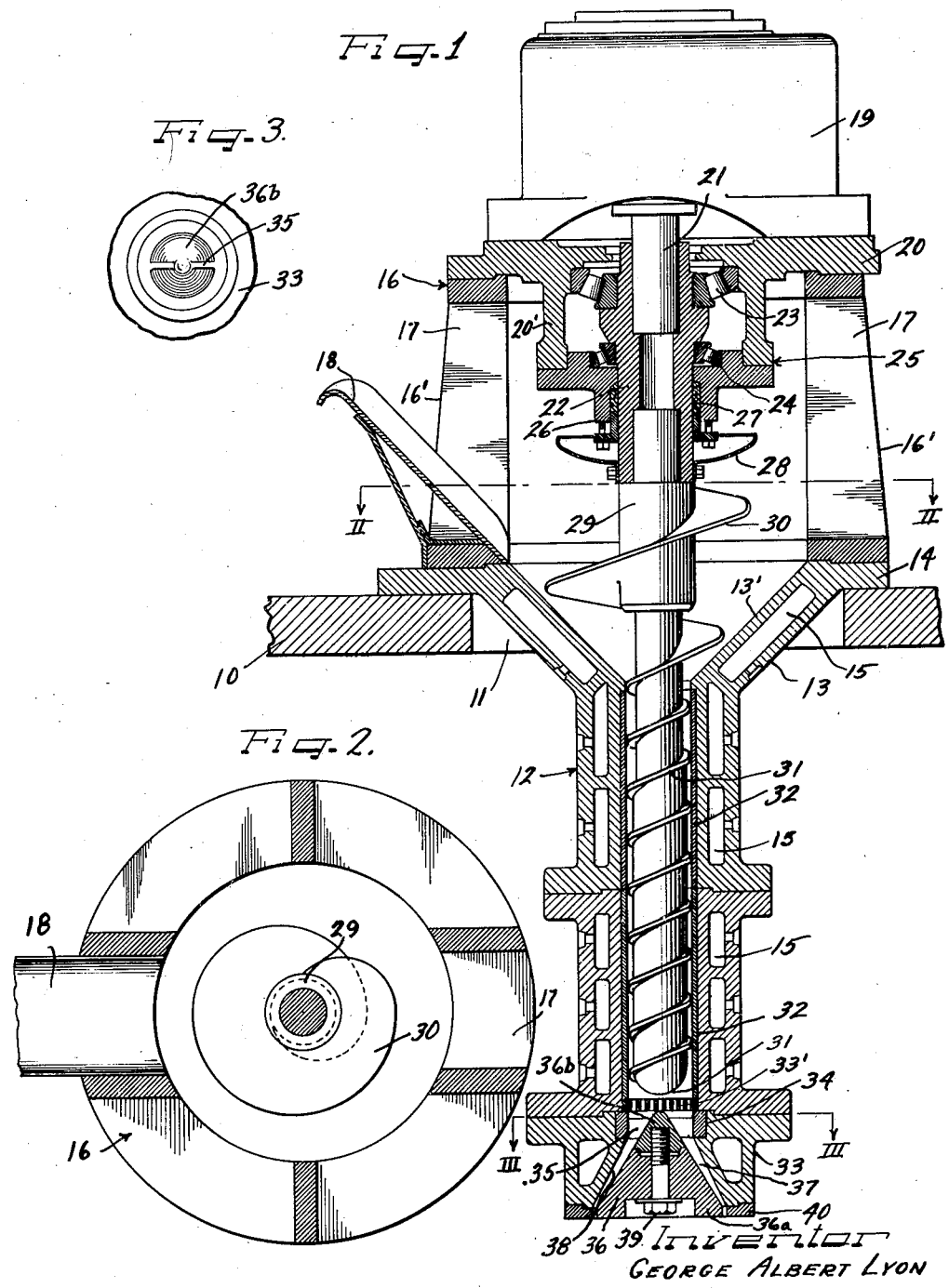
Inventor
GEORGE ALBERT LYON Patented Mar. 7, 1950

2,499,398

UNITED STATES PATENT OFFICE 2,499,398

PLASTIC EXTRUDER

George Albert Lyon, Allenhurst, N. J.

Application December 22, 1945, Serial No. 636,874

3 Claims. (Cl. 18—14)

This invention relates to an extruder and more particularly to an extruder adapted to handle synthetic plastic materials.

In the extruding of synthetic plastic, such as ethyl cellulose, vinyl resins and the like, it has been my observation that there is a tendency for the material to back up away from the nozzle end of the extruder when the extruder is in a vertical position. As a consequence the material being extruded is not uniformly pushed forward and out of the nozzle of the extruder.

An object of this invention is to provide an improved extruder adapted to be mounted in a vertical position so as to discharge downwardly therefrom and which will satisfactorily handle synthetic plastics.

Another object is to provide an improved plastic conveying or impelling device.

Another object of this invention is to provide an improved extruder which may be very easily and readily charged with batches of plastic material or mix.

A still further object of this invention is to provide a power driven extruder wherein the likelihood of oil from the bearings getting into the plastic material is minimized.

Still another object of this invention is to provide a simple form of plastic extruder which may be economically manufactured and which will enable a constant and uniform discharge of tubular plastic rod.

In accordance with the general features of this invention there is provided in an extruder a shaft having a spiral extruder fin telescoping a tube and arranged to force plastic out of a nozzle at the end of the tube, the shaft also having a spiral fin of a larger diameter than the normal fin located in the part where the batches of plastic material are applied thereto.

This enlarged spiral fin is of such length and arrangement with reference to the material and the tube of the extruder that it will insure that the plastic material is forced downwardly toward the nozzle thereby minimizing the likelihood of the plastic material backing up in a direction away from the discharge end of the extruder.

Another feature of the invention relates to the provision of a dished guard on an extruding shaft above the extruding fins and adjacent the bearings of the shaft so as to receive any drippings of oil from the bearings and which prevents the same from being introduced in the plastic mix in the extruder.

Still another feature of the invention relates to the locating of the enlarged spiral fin opposite a conical-like opening and adjacent the inlet of the extruder so that the charge of plastic introduced in the extruder will be wedged by this fin downwardly through the conical opening and toward the discharge end of the extruder.

Still another feature of the invention relates to the provision of a simplified form of nozzle at the discharge end of the extruder for forming the extruded plastic into a tubular or annular shaft as it is advanced out of the extruder.

Other objects and features of this invention will be more fully apparent from the following detailed description taken in connection with the accompanying drawings, which illustrate a single embodiment thereof and in which Fig. 1 is a fragmentary vertical sectional view partly in elevation through an extruding apparatus embracing the features of this invention;

Figure 2 is a fragmentary cross-sectional view taken on the line II—II of Figure 1 looking downwardly; and Figure 3 is a cross-sectional view taken on the line III—III of Figure 1 looking downwardly and showing the construction of the nozzle end of the extruder.

As shown on the drawings:

The reference character 10 designates a supporting platform for the extruder having an opening 11 through which the lower portion 12 of the extruder extends. This portion 12 may be made up of a series of aligned sections detachably held together. This tubular series of sections 12 terminate at the upper end in a frusto-conical section 13, which in turn terminates in a flange 14 adapted to rest on the support or platform 10 about the opening 11.

The sections 12, as well as the frusto-conical section 13, may comprise castings and are preferably formed hollow at 15 for the introduction of a heating medium therein in the usual way. In other words, these sections are jacketed and are adapated to heat the plastic material to the required temperature necessary for the proper flow of the material as it is being extruded.

Supported upon and detachably secured to the flange 14 is an upper housing 16 including posts or columns 16' providing opposite openings 17 through at least one of which plastic material is adapted to be introduced in the interior of the housing along an inclined hopper 18. The hopper is positioned to discharge directly onto the conical interior surface 13' of the conical section 13 of the extruder. Thus the plastic material introduced in the housing 16 and in the conical section 13 is open to the atmosphere and is hence subjected to atmospheric pressure. Carried by the housing 16 is an electric motor 19 supported upon a casting or platform 20 detachably secured to the upper end of the housing 16. This motor includes a downward depending stub shaft 21 which telescopes a short length of a hollow shaft 22 projecting downwardly through a depending flange 20' formed on the underside of the platform 20.

This flange 20' defines an oil or lubricant chamber in which are located axially spaced anti-frictional bearings 23 and 24, in which the intermediate tubular shaft 22 is journalled. The bottom of the flange or skirt 20' is closed by a ring-like plate 25 on which the bearing 24 is carried. This plate surrounds the hollow shaft 22 and includes a depending skirt 26 in which is located a leather gland or seal 27 surrounding the shaft 22. Below this seal 27 is a hollow or dished annular guard 28 suitably held around the shaft 22 so as to receive any oil drippings that may possibly pass the seal 27. In this way leakage of oil into the plastic material is minimized.

Aligned with and partially telescoping the tubular shaft 22 is a lower shaft 29 which carries the extruding screw to be hereinafter described in detail. It should be borne in mind that shafts 21, 22 and 29 are keyed together so that they will rotate in unison when the motor 19 is operated.

The shaft 29 immediately below the oil guard 28 is provided with an enlarged spiral fin 30 which is connected to a smaller size spiral fin 31 located inside of the depending tubular jacketed sections 12. The enlarged fin 30 is positioned in the conical-like opening 13' defined by the section 13 and directly at the discharge end of the hopper 18. This arrangement is such that as the plastic material is delivered into the upper housing section 16, it is immediately engaged by the enlarged fin 30 and forcibly wedged downwardly toward the conical-like section 13 and into the bore of the tubular sections 12 where the material is propelled forward by the smaller fin 31.

The advantage of this arrangement is that the likelihood of the material moving upwardly instead of downwardly is minimized by reason of the squeezing or wedging action of the comparatively larger spiral fin 30.

The bore of the tubular section 12, which may comprise castings. is preferably provided with a liner 32 which terminates at a breaker or perforated plate 33'. The lower end of this liner 32 discharges into a nozzle housing designated generally by the reference character 33. The lower end of the shaft 29 is preferably rounded at 31 directly adjacent the lower end of the liner 32 and above the breaker plate 33' so that the fin 31 forces the plastic directly against the plate 33' which breaks up the plastic before it reaches nozzle 33.

The lower nozzle section 33 may be flanged and detachably fastened in any convenient way to the flanged end of the lower tubular section 12. This section 33, like the others, may be formed hollow or jacketed for heating.

Positioned directly under breaker plate 33' on a shoulder in the central bore of the nozzle housing 33 is a spider-like ring 34. This ring is provided with spaced webs 35 so that the plastic material can pass between the webs after it has been forced through breaker plate 33'.

Located centrally of the section 33 is a conical-like nozzle member 36 which is spaced from a conical-like wall 38 in the nozzle section 33 thus providing an annular inclined or conical passage 37. This conical element 36 comprises two sections, namely, a lower part 36a and an upper part 36b, the upper part of which is preferably formed integrally with the webs 35 of the ring 34. The two parts 36a and 36b are detachably fastened together by means of a central bolt assembly 39.

The outer extremity of the nozzle section 33 may be provided with a detachable ring 40 which is in the nature of a sizing or die ring. In other words, this ring has a predetermined opening of such size as to enable the discharge of an annulus or tube of plastic material of predetermined diameter and thickness.

The bore of this ring 40 is aligned with a conical-like opening 37 in the nozzle section 33 so as to control the thickness of the wall of the extruded plastic tube.

This extruder is in reality an impelling device and in fact can be employed to pump or convey plastic and the like from one area to another.

The operation of my extruder is believed to be clear from the foregoing description. Different size plastic tubing may be very economically produced by the use of this device.

I claim as my invention:

1. In combination in a vertical extruder, a housing having a generally conically shaped feed surface concentric with and converging to a downwardly extending extrusion tube, said conically shaped feed surface defining a chamber open to atmosphere and being adapted to receive therein plastic material to be extruded, an extrusion nozzle at the lower end of said extrusion tube, and a feed screw having a portion working closely within said tube and a portion working in the feed chamber defined by said conically shaped surface, the portion of said screw within said tube having a spiral fin formed in relatively close high pitched spirals, and the portion of the screw working in said chamber being formed with a spiral fin of greatly increased spacing and diameter but lower pitch, said last mentioned spiral fin extending continuously from well above the upper edge of said conically shaped surface to uninterrupted juncture with the fin in the tube at the mouth of said tube for immediately engaging and wedgingly urging material introduced into said feed chamber downwardly toward the mouth of said tube whereby to resist back pressure developed in the tube during operation.

2. In combination in an extruder of the character described, an extrusion tube having a feed screw operable therein, a nozzle housing member secured coaxially at the end of said feed screw and providing a discharge orifice of generally conically flaring form, a two part core of cone shape including a tip portion having an integral spider and pointing coaxially toward the opposing end of the feed screw, said spider being secured in place by interengagement with said nozzle housing adjacent to said tube end, the second part of the cone continuing the extent of the cone to the mouth of the orifice, and a bolt extending up through said second cone part and securing the same to the underside of said tip portion.

3. In combination in a vertical extruder including: a vertical feed screw, an extruder tube, means defining a feed chamber at the upper end of said tube, said feed screw having finned portions thereof operatable in said chamber and in said extruder tube in operative sequence, means for rotatably drivingly supporting said feed screw above said chamber and including a rotary feed screw portion and a supporting bearing structure, a housing enclosing said bearing structure, a lubricant seal between the lower portion of said housing and said feed screw portion, and an upwardly opening dished lubricant guard carried by the feed screw below said lower portion of the housing and above said chamber to prevent lubricant that may escape past said seal from dropping into the material in said chamber.

GEORGE ALBERT LYON.

REFERENCES CITED

The following references are of record in the file of this patent:

UNITED STATES PATENTS

| Number | Name | Date |
|---|---|---|
| 97,035 | Bryant | Nov. 23, 1869 |
| 574,577 | Royle | Jan. 5, 1897 |
| 1,196,648 | Bleecker | Aug. 29, 1916 |
| 1,768,671 | Devine | July 1, 1930 |
| 1,800,180 | Day | Apr. 7, 1931 |
| 1,914,689 | Humphrey | June 20, 1933 |
| 1,956,330 | Mullin | Apr. 24, 1934 |
| 2,011,055 | Klugh | Aug. 13, 1935 |
| 2,043,681 | Walter | June 9, 1936 |
| 2,291,212 | Clinefelter | July 28, 1942 |
| 2,370,469 | Johnson | Feb. 27, 1945 |
| 2,384,521 | Andersen | Sept. 11, 1945 |